(12) United States Patent
Hisa et al.

(10) Patent No.: US 8,736,653 B2
(45) Date of Patent: May 27, 2014

(54) OPTICAL SCANNING DEVICE, IMAGE FORMING APPARATUS, AND OPTICAL SCANNING METHOD

(75) Inventors: Fumiya Hisa, Kanagawa (JP); Toshiharu Orui, Kanagawa (JP); Tomoaki Sakita, Kanagawa (JP); Yuma Motegi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 365 days.

(21) Appl. No.: 13/152,059

(22) Filed: Jun. 2, 2011

(65) Prior Publication Data

US 2012/0099161 A1  Apr. 26, 2012

(30) Foreign Application Priority Data

Oct. 26, 2010 (JP) .................................. 2010-239330

(51) Int. Cl.
*B41J 15/14* (2006.01)
*B41J 27/00* (2006.01)

(52) U.S. Cl.
USPC .......................................... 347/242; 347/257

(58) Field of Classification Search
USPC .................. 347/231, 241–245, 256–261, 263; 359/849, 862, 865, 871, 881, 883
See application file for complete search history.

(56) References Cited

U.S. PATENT DOCUMENTS 5,245,481 A * 9/1993 Kaneko et al. ................. 359/896
8,174,748 B2 * 5/2012 Andoh et al. ............... 359/208.1

FOREIGN PATENT DOCUMENTS

| JP | 2885288 B2 | 10/1990 |
| JP | H03-93692 U | 9/1991 |
| JP | 2002-341121 A | 11/2002 |
| JP | 2005-107064 A | 4/2005 |

OTHER PUBLICATIONS

Japanese Office Action issued in counterpart Japanese Patent Application No. 2010-239330 dated Jan. 21, 2014.

* cited by examiner

*Primary Examiner* — Hai C Pham
(74) *Attorney, Agent, or Firm* — Sughrue Mion, PLLC (57) ABSTRACT

An optical scanning device includes a housing, a light source that emits light, a rotatable polygon mirror that receives the light from the light source while rotating and deflects the light by reflecting the light in a direction corresponding to an angle of rotation thereof, a scanning optical system that guides the light from the rotatable polygon mirror to a scanning object in such a manner as to repeatedly scan the scanning object with the light, and an intermediate member that is provided between an optical member included in the scanning optical system and the housing. The intermediate member is connected to the optical member with rubber adhesive and is also connected to the housing with the rubber adhesive.

20 Claims, 6 Drawing Sheets

OPTICAL SCANNING DEVICE, IMAGE FORMING APPARATUS, AND OPTICAL SCANNING METHOD

CROSS-REFERENCE TO RELATED APPLICATIONS

This application is based on and claims priority under 35 USC 119 from Japanese Patent Application No. 2010-239330 filed Oct. 26, 2010.

BACKGROUND (i) Technical Field

The present invention relates to an optical scanning device, an image forming apparatus, and an optical scanning method.

(ii) Related Art

Typical image forming apparatuses include an apparatus employing an exposure device that forms an electrostatic latent image by scanning an image bearing member with light. Such an exposure device includes optical members. Vibrations of the optical members need to be suppressed.

SUMMARY

According to an aspect of the invention, there is provided an optical scanning device including a housing, a light source that emits light, a rotatable polygon mirror that receives the light from the light source while rotating and deflects the light by reflecting the light in a direction corresponding to an angle of rotation thereof, a scanning optical system that guides the light from the rotatable polygon mirror to a scanning object in such a manner as to repeatedly scan the scanning object with the light, and an intermediate member that is provided between an optical member included in the scanning optical system and the housing. The intermediate member is connected to the optical member with rubber adhesive and is also connected to the housing with the rubber adhesive.

BRIEF DESCRIPTION OF THE DRAWINGS

An exemplary embodiment of the present invention will be described in detail based on the following figures, wherein.

DETAILED DESCRIPTION

An exemplary embodiment of the present invention will now be described.

Figure 1:
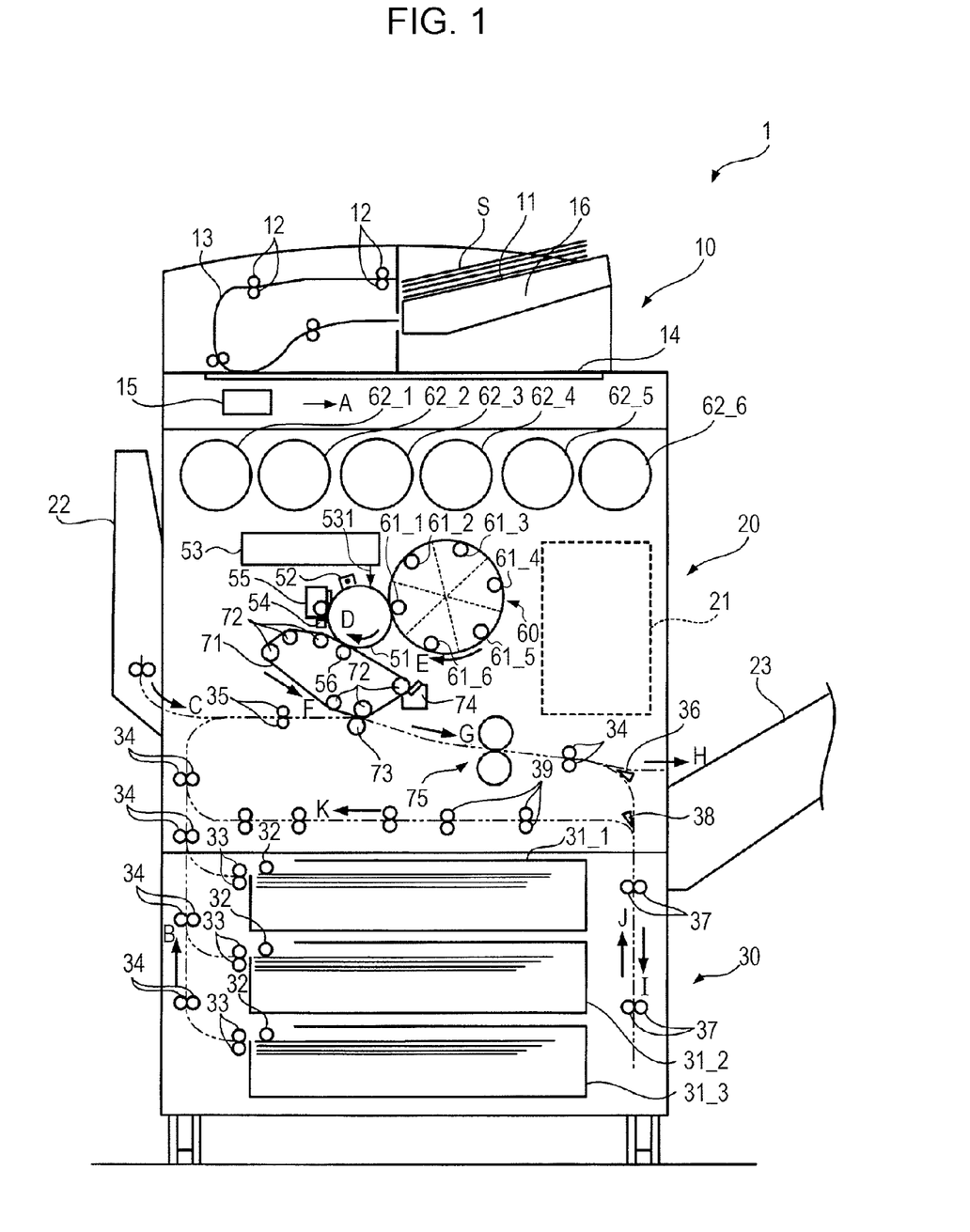
FIG. 1 schematically illustrates an image forming apparatus according to an exemplary embodiment of the invention.

FIG. 1 schematically illustrates an image forming apparatus 1 according to an exemplary embodiment of the invention. The image forming apparatus 1 includes an exposure device 53. The exposure device 53 corresponds to an exemplary embodiment of the optical scanning device according to the invention.

The image forming apparatus 1 includes a document reading section 10, an image forming section 20, and a paper containing section 30.

The document reading section 10 includes a document feeding tray 11 on which document sheets S are stacked. The document sheets S on the document feeding tray 11 are fed out one by one. Each of the fed document sheets S is transported along a transport path 13 by transport rollers 12. A document-reading optical system 15 is provided under a document reading plate 14 made of transparent glass and reads characters and images recorded on the document sheet S. Subsequently, the document sheet S is output onto a document output tray 16.

The document reading section 10 includes a hinge extending laterally at the back thereof. The document feeding tray 11 and the document output tray 16 are rotatably movable upward together about the hinge. When the document feeding tray 11 and the document output tray 16 are moved upward, the document reading plate 14 appears. In the document reading section 10, instead of placing document sheets S on the document feeding tray 11, one document sheet S may be placed face down on the document reading plate 14. In this state, when the document-reading optical system 15 is moved in the direction of arrow A, characters and images recorded on the document sheet S on the document reading plate 14 are read.

An image signal is generated by the document-reading optical system 15 and is input to a processing/controlling circuit 21. The processing/controlling circuit 21 forms an image on the basis of the image signal in a manner described separately below. The processing/controlling circuit 21 controls the operations of various elements included in the image forming apparatus 1.

The paper containing section 30 is provided at the bottom of the image forming apparatus 1 and includes three paper feeding trays 31_1 to 31_3. The paper feeding trays 31_1 to 31_3 contain pieces of paper P of, for example, respectively different sizes that are stacked therein. The paper feeding trays 31_1 to 31_3 are drawable outward for refilling of paper P.

Some pieces of paper P are picked up from one of the three paper feeding trays 31_1 to 31_3 (herein, the paper feeding tray 31_3 is taken as an example) that contains pieces of paper P matching, for example, the size of the document sheet S by a corresponding one of pickup rollers 32. The pieces of paper P are separated one by one by separating rollers 33. Each of the pieces of paper P is transported upward in the direction of arrow B by transport rollers 34, and is further transported by standby rollers 35 with a timing adjusted by the standby rollers 35. The subsequent process of transportation from the standby rollers 35 will be described separately below.

The image forming section 20 includes a manual feeding tray 22. The manual feeding tray 22 is of foldable type and is openable about the lower end thereof. By opening the manual feeding tray 22 and placing pieces of paper P thereon, each of the pieces of paper P on the manual feeding tray 22 is feedable in the direction of arrow C.

The image forming section 20 also includes in a middle portion thereof a photoconductor 51 configured to rotate in the direction of arrow D. A charging device 52, a developing device 60, a static eliminating device 54, and a cleaner 55 are provided around the photoconductor 51. The exposure device 53 is positioned above the photoconductor 51. Furthermore, a transfer device 56 is provided such that an intermediate transfer belt 71, described separately below, is held between the photoconductor 51 and the transfer device 56.

The photoconductor 51 has a round cylindrical shape. The photoconductor 51 bears an electrical charge by being charged, and releases the electrical charge by being subjected to exposure. Thus, an electrostatic latent image is formed on the surface of the photoconductor 51.

The charging device 52 charges the surface of the photoconductor 51 to a specific potential.

The exposure device 53 receives the image signal from the processing/controlling circuit 21 and outputs light 531 modulated in accordance with the image signal. The charging device 52 charges a portion of the surface of the photoconductor 51 rotating in the direction of arrow D. The charged portion of the photoconductor 51 is repeatedly scanned with the light 531 along the rotational axis of the photoconductor 51 (in a direction perpendicular to the page surface of FIG. 1). Thus, an electrostatic latent image is formed on the surface of the photoconductor 51. The electrostatic latent image formed on the surface of the photoconductor 51 by the scanning with the light 531 is developed by the developing device 60. Thus, a toner image is formed on the surface of the photoconductor 51. Specifically, the developing device 60 includes six developing units 61_1 to 61_6. The developing device 60 is configured to rotate in the direction of arrow E such that one of the six developing units 61_1 to 61_6 (in FIG. 1, the developing unit 61_1) faces the photoconductor 51. The electrostatic latent image formed on the photoconductor 51 is developed by the developing unit (herein, the developing unit 61_1) facing the photoconductor 51. Thus, the toner image is formed.

The six developing units 61_1 to 61_6 included in the developing device 60 contain toners having respective colors of yellow (Y), magenta (M), cyan (C), black (K), and two special colors selected in accordance with the use by the user. In developing the electrostatic latent image on the photoconductor 51, one of the developing units 61_1 to 61_6 containing a toner having a color to be used at that time is brought to the position facing the photoconductor 51, and development is performed by the developing unit facing the photoconductor 51 with the toner contained therein. Examples of the special colors selected in accordance with the use by the user include a transparent toner for glossy finish of the image and a toner having an adjusted color frequently used by the user.

Six toner tanks 62_1 to 62_6 containing toners having the same colors as those of the respective toners used by the six developing units 61_1 to 61_6 are provided above the developing device 60. When the amounts of any toners in the developing units 61_1 to 61_6 are reduced, the toners in corresponding ones of the toner tanks 62_1 to 62_6 are supplied to corresponding ones of the developing units 61_1 to 61_6.

The toner image developed on the photoconductor 51 by the developing device 60 is transferred to the intermediate transfer belt 71 through an operation of the transfer device 56.

After the transfer, the electrical charge on the photoconductor 51 is eliminated by the static eliminating device 54, and toners remaining on the photoconductor 51 after the transfer are removed by the cleaner 55.

The intermediate transfer belt 71 is an endless belt stretched around plural rollers 72 and rotates in the direction of arrow F. A transfer device 73 is provided near the intermediate transfer belt 71 with a transport path for the paper P defined therebetween. A cleaner 74 configured to remove toners remaining on the intermediate transfer belt 71 after the transfer by the transfer device 73 is provided on the downstream side with respect to the transfer device 73 in the direction of rotation of the intermediate transfer belt 71. The transfer device 73 and the cleaner 74 are spaced away from the intermediate transfer belt 71 and are configured to be brought into contact with the intermediate transfer belt 71. In forming a multi-color image, while the transfer device 73 and the cleaner 74 are held away from the intermediate transfer belt 71, a process of forming a toner image on the photoconductor 51 with a toner having a specific color and transferring the toner image to the intermediate transfer belt 71 is repeated for the number of relevant developing units (the number of relevant toner colors) by rotating the developing device 60. Thus, plural toner images in different colors are sequentially superposed on the intermediate transfer belt 71.

Subsequently, the transfer device 73 is brought into contact with the intermediate transfer belt 71, and a piece of paper P is fed out by the standby rollers 35 such that the piece of paper P reaches a transfer position, where the transfer device 73 is provided, when the set of superposed toner images in different colors reaches the transfer position. Thus, the set of toner images in different colors on the intermediate transfer belt 71 is transferred to the piece of paper P at the transfer position through an operation of the transfer device 73. The piece of paper P having the set of toner images transferred thereon is further transported in the direction of arrow G and is subjected to heat and pressure applied by a fixing device 75. Thus, an image as a set of fixed toner images is obtained on the piece of paper P. The piece of paper P that has passed through the fixing device 75 is further transported in the direction of arrow H and is output onto a paper output tray 23.

Furthermore, the cleaner 74 is brought into contact with the intermediate transfer belt 71, and toners remaining on the intermediate transfer belt 71 after the transfer by the transfer device 73 are removed from the intermediate transfer belt 71 by the cleaner 74.

The image forming apparatus 1 is capable of forming images on both sides of each piece of paper P. In forming images on both sides of a piece of paper P, the piece of paper P having an image on a first side thereof as described above is not output onto the paper output tray 23. Instead, a guiding member 36 is turned, and the piece of paper P is thus transported in the direction of arrow I by transport rollers 37. Subsequently, the direction of transportation is reversed, and the piece of paper P is guided by another guiding member 38 in such a manner as to be transported in the direction of arrow K by transport rollers 39 and reaches the standby rollers 35.

Subsequently, as in the case described above, another image is formed on a second side of the piece of paper P. The piece of paper P thus having the images on both sides thereof is output onto the paper output tray 23.

Figure 2:
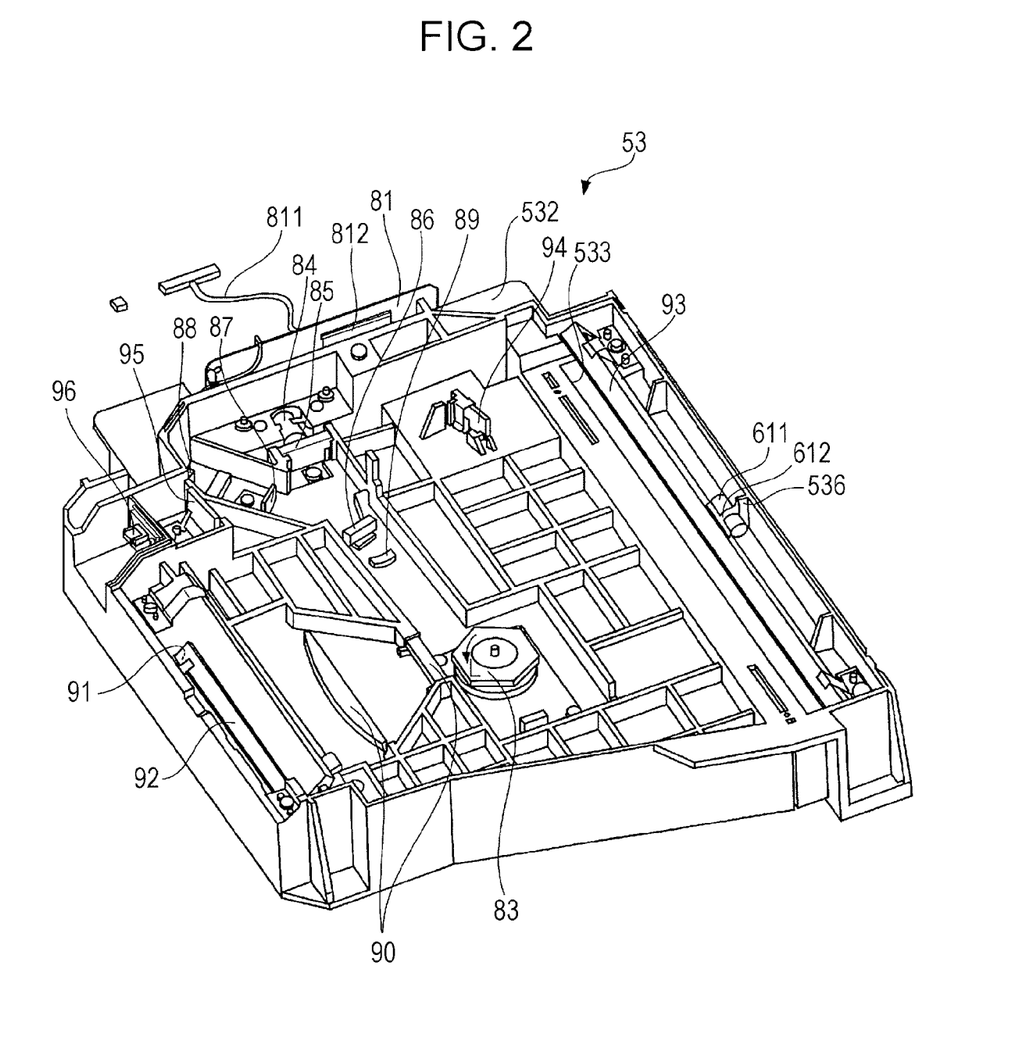
FIG. 2 is a perspective view of an exposure device.

FIG. 2 is a perspective view of the exposure device 53.

FIG. 2 illustrates the inside of the exposure device 53 with a cover thereof removed.

The exposure device 53 includes a housing 532. A circuit board 81 is fixed to the housing 532. A surface-emitting laser diode 82 (see FIGS. 3 and 4) is mounted on the circuit board 81, and a cable 811 is connected to the circuit board 81. A processing circuit 812 is also mounted on the circuit board 81. The laser diode 82 mounted on the circuit board 81 emits plural beams of light 531. Hence, the exposure device 53 is configured to scan the photoconductor 51 illustrated in FIG. 1 with the plural beams of light 531 at a time.

The cable 811 is also connected to the processing/controlling circuit 21 illustrated in FIG. 1 and transmits the image signal from the processing/controlling circuit 21 to the circuit board 81. The image signal transmitted to the circuit board 81 is processed by the processing circuit 812 and is converted into a modulation signal that controls the modulation of the light 531 to be emitted from the laser diode 82, and the modulation signal is transmitted to the laser diode 82. Thus, the laser diode 82 emits plural beams of light 531 modulated in accordance with the modulation signal thus transmitted.

The housing 532 of the exposure device 53 houses an optical system including a rotatable polygon mirror 83 and other optical members.

Figure 3:
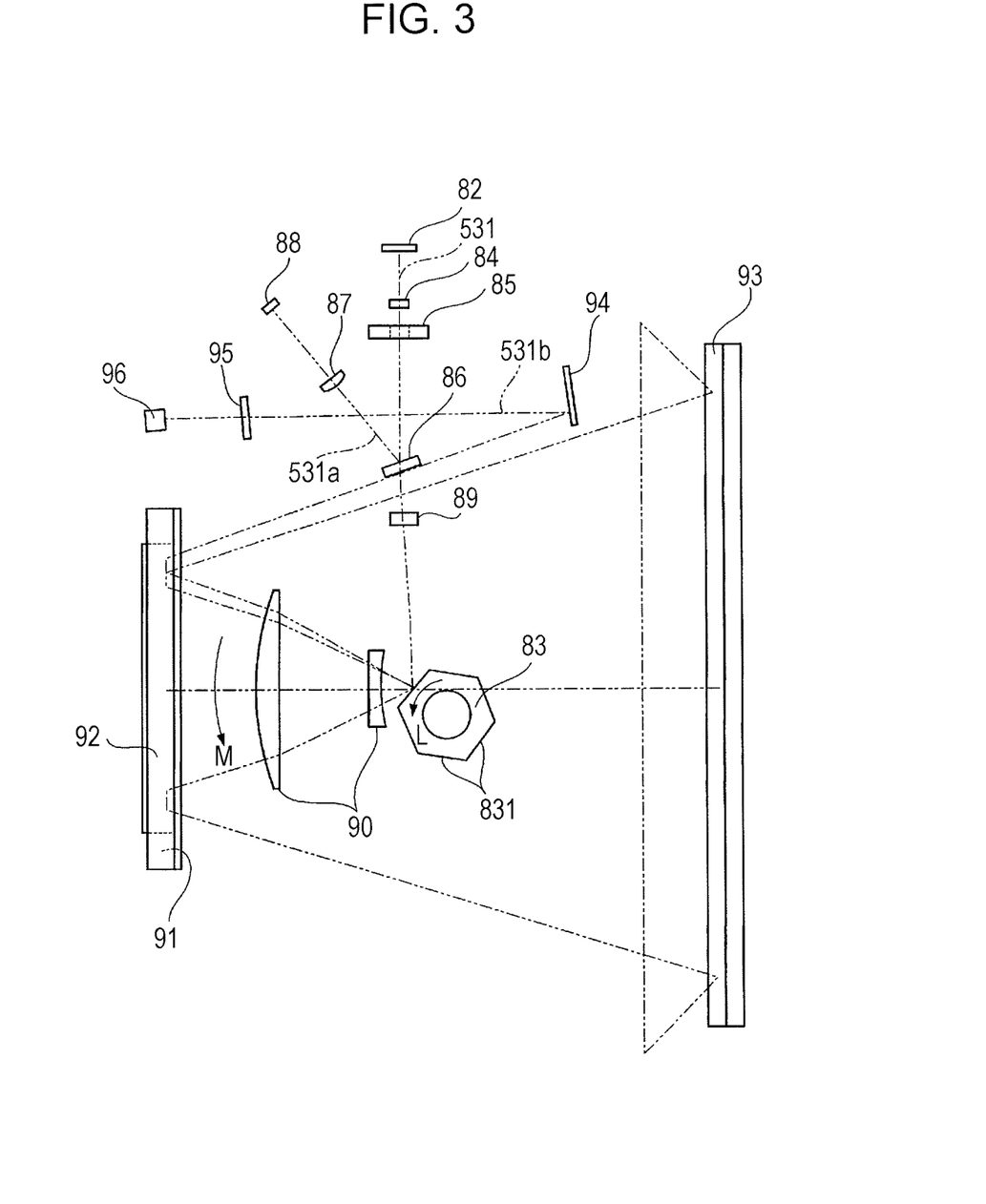
FIG. 3 is a plan view of an optical system provided in a housing of the exposure device.
Figure 4:
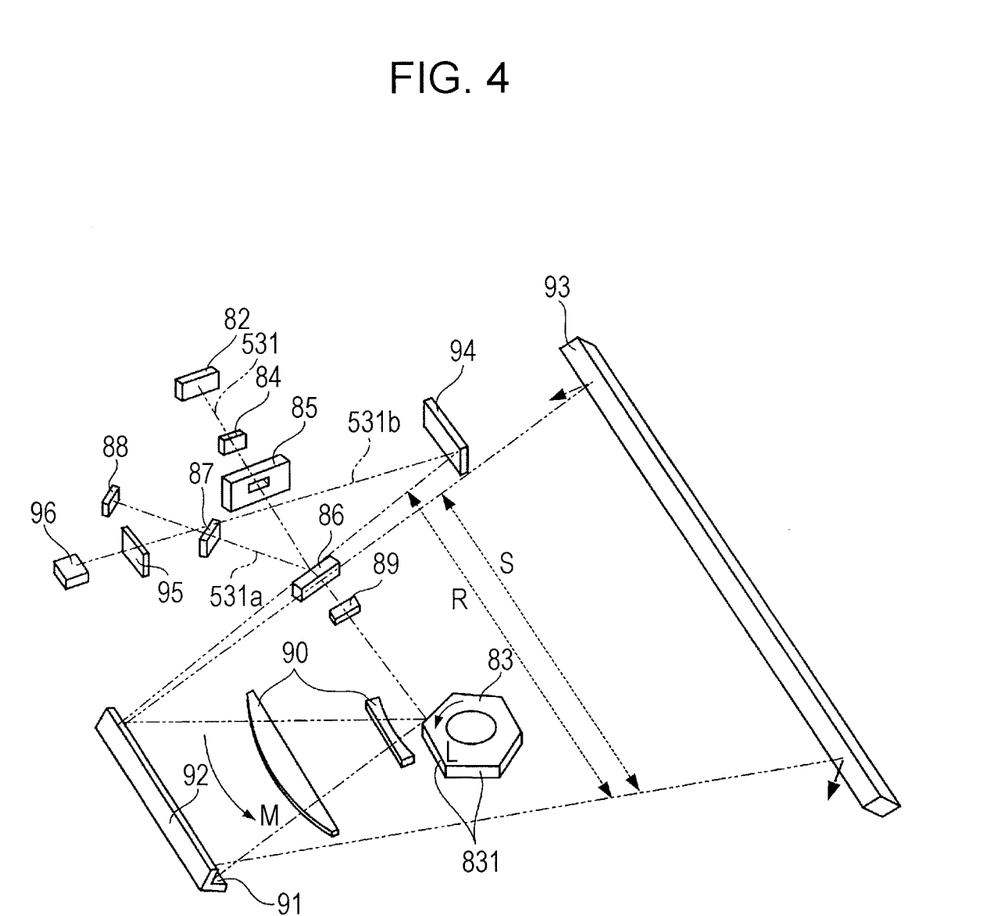
FIG. 4 is a perspective view of the optical system provided in the housing of the exposure device.

FIGS. 3 and 4 are a plan view and a perspective view, respectively, of the optical system housed in the housing 532 of the exposure device 53.

The light 531, including plural beams, emitted from the laser diode 82 travels through a collimating lens 84 and an aperture 85, and strikes a half mirror 86. The half mirror 86 reflects part of the light 531 as reflected light 531a. The reflected light 531a travels through a focusing lens 87 and enters an optical sensor 88 for light quantity detection. A photodetection signal is generated by the optical sensor 88 and is transmitted to the circuit board 81 illustrated in FIG. 2. The quantity of light 531 to be emitted from the laser diode 82 is adjusted on the basis of the photodetection signal by the processing circuit 812 mounted on the circuit board 81.

Other part of the light 531 is transmitted through the half mirror 86, travels through a cylindrical lens 89, and strikes the rotatable polygon mirror 83. The rotatable polygon mirror 83 has peripheral surfaces 831 functioning as reflective mirrors and reflects incoming light in a direction corresponding to the angle of rotation thereof. The rotatable polygon mirror 83 rotates in the direction of arrow L. Hence, the light 531 reflected by the rotatable polygon mirror 83 is repeatedly deflected in the direction of arrow M.

The light 531 reflected by the rotatable polygon mirror 83 travels through fθ lens elements 90, is reflected upward by a cylindrical mirror 91, and is reflected by a plane mirror 92 in such a direction that the optical path is turned. The light 531 reflected by the plane mirror 92 travels above the fθ lens elements 90 and the rotatable polygon mirror 83, is reflected downward by a cylindrical mirror 93, travels through an opening 533 (see FIG. 2) provided in the housing 532, and is emitted downward from the housing 532. The light 531 emitted from the housing 532 of the exposure device 53 is used for scanning of the photoconductor 51 along the rotational axis of the photoconductor 51, as illustrated in FIG. 1. Thus, an electrostatic latent image is formed on the photoconductor 51.

Referring to FIG. 4, a reflective mirror 94 is provided at a position inside a deflection range R within which the light 531 is deflected by the rotatable polygon mirror 83 and outside a scanning area S used for the scanning of the photoconductor 51. The light 531 reflected by the plane mirror 92 is reflected by the reflective mirror 94 as reflected light 531b at the start of each scan. The reflected light 531b from the reflective mirror 94 travels through a focusing lens 95 and enters an optical sensor 96 for timing detection.

The optical sensor 96 detects the start timing of each scan so as to adjust the timing of modulation of the light 531. A photodetection signal is generated by the optical sensor 96 and is transmitted to the processing/controlling circuit 21 (see FIG. 1). The processing/controlling circuit 21 generates an image signal whose timing is adjusted on the basis of the photodetection signal. The image signal from the processing/controlling circuit 21 is input to the circuit board 81 through the cable 811. Thus, the laser diode 82 emits the light 531 modulated in accordance with the modulation signal based on the image signal received through the cable 811 with the light quantity adjusted on the basis of the photodetection signal generated by the optical sensor 88.

The cylindrical mirror 93 is one of the optical members included in the scanning optical system that guides the light 531 reflected and deflected by the rotatable polygon mirror 83 to the photoconductor 51 (see FIG. 1). In the exposure device 53, as illustrated in FIG. 2, an intermediate member 611 is provided between a back surface 932 (see FIGS. 6 to 8) of the cylindrical mirror 93 and the housing 532. The intermediate member 611 is connected to the housing 532 and to the cylindrical mirror 93 with rubber adhesive 612.

The cylindrical mirror 93 is a long mirror extending in the direction of scanning with the light 531. When any vibration caused by the operation of the image forming apparatus 1 illustrated in FIG. 1 is transmitted to the cylindrical mirror 93 and the cylindrical mirror 93 is vibrated, the electrostatic latent image on the photoconductor 51 and, consequently, an image to be formed on the paper P may have quality failure.

Particularly, in the case of the image forming apparatus 1 configured as illustrated in FIG. 1, when the developing units 61_1 to 61_6 are switched therebetween, the developing device 60 is rotated, and the rotation produces a large vibration. On the other hand, the image productivity is desired to be increased. To increase the image productivity, it is undesirable to suspend the exposure operation of the exposure device 53 (the operation of scanning the photoconductor 51 with the light 531) when the developing device 60 is rotated.

Hence, in the exemplary embodiment, vibration of the cylindrical mirror 93 due to the vibration of the body of the image forming apparatus 1 is suppressed by providing the intermediate member 611 and the rubber adhesive 612.

Figure 5:
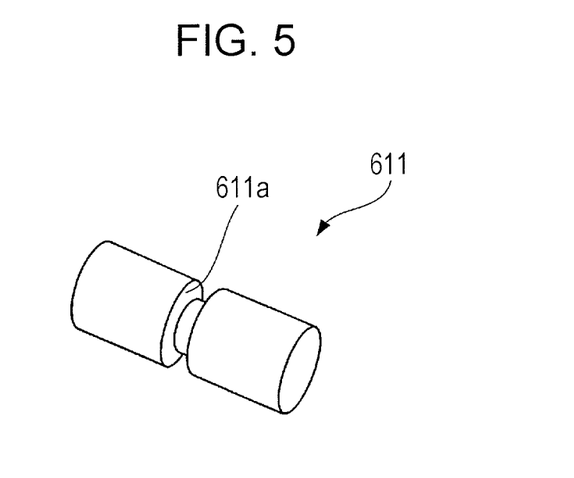
FIG. 5 is a perspective view of an intermediate member employed in the exposure device illustrated in FIG. 2.

FIG. 5 is a perspective view of the intermediate member 611 employed in the exposure device 53 illustrated in FIG. 2.

The intermediate member 611 is made of aluminum and generally has a round columnar shape or a substantially round columnar shape with a groove 611a, which is an exemplary recess, provided in a middle portion thereof. The intermediate member 611 is obtained by simply cutting and grinding a round aluminum bar and is therefore manufactured at a low cost.

Figure 6:
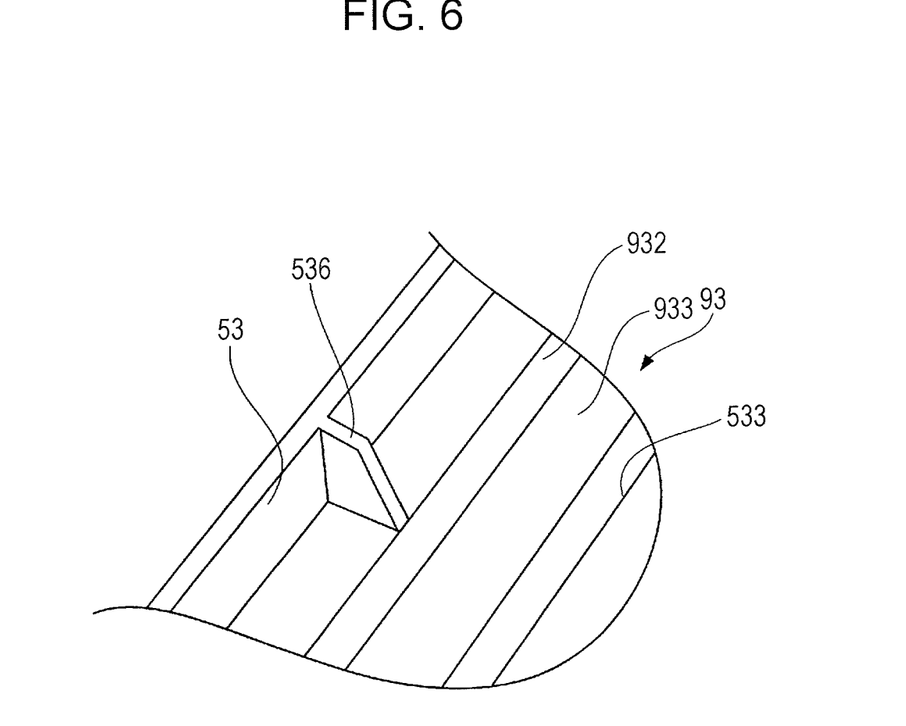
FIG. 6 is an enlarged view illustrating a middle portion of a cylindrical mirror without the intermediate member.

FIG. 6 is an enlarged view illustrating a middle portion of the cylindrical mirror 93. FIG. 6 illustrates a state without the intermediate member 611.

Figure 7:
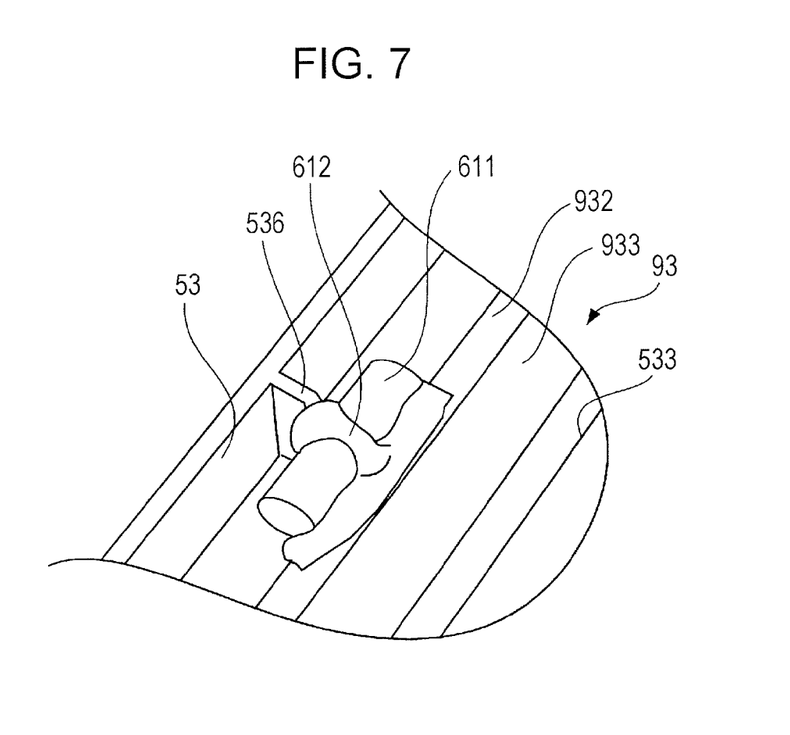
FIG. 7 illustrates the middle portion of the cylindrical mirror illustrated in FIG. 6 with the intermediate member.

FIG. 7 illustrates the middle portion of the cylindrical mirror 93 illustrated in FIG. 6 with the intermediate member 611.

The cylindrical mirror 93 is positioned such that a reflective surface 931 thereof (see FIG. 8) is oriented obliquely downward. FIGS. 6 and 7 illustrate the back surface 932 and a top surface 933 of the cylindrical mirror 93. FIGS. 6 and 7 also illustrate the opening 533 provided in the housing 532 (see FIG. 2).

The housing 532 has a rib 536 projecting toward the back surface 932 of the cylindrical mirror 93. The intermediate member 611 having a round columnar shape or a substantially round columnar shape as illustrated in FIG. 5 is positioned such that the center axis thereof extends in the longitudinal direction of the cylindrical mirror 93, with the rib 536 fitted in the groove 611a provided in the middle portion of the intermediate member 611. Thus, by positioning the intermediate member 611 such that the rib 536 is fitted into the groove 611a, the intermediate member 611 is easily positioned in a predetermined orientation and at a predetermined position. The intermediate member 611 is in line contact with the back surface 932 of the cylindrical mirror 93 by a large length in the longitudinal direction of the cylindrical mirror 93. The line contact, i.e., the contact in the longitudinal direction of the cylindrical mirror 93, more effectively suppresses vibration of the cylindrical mirror 93.

With the intermediate member 611 being positioned as described above, the rubber adhesive 612 is provided over the spaces between the intermediate member 611 and the back surface 932 of the cylindrical mirror 93 and between the intermediate member 611 and the rib 536 of the housing 532, whereby the intermediate member 611 is connected to the cylindrical mirror 93 and to the housing 532.

The rubber adhesive 612 directly connects the back surface 932 of the cylindrical mirror 93 and the rib 536 of the housing 532 to each other in such a manner as to fill the groove 611a (see FIG. 5) of the intermediate member 611.

The rubber adhesive 612 may be, but is not limited to, any adhesive that is expandable and contractible after being cured, as rubber is. Examples of the rubber adhesive 612 include the following products: Super-X series and PM series of Cemedine Co., Ltd., and Silex 100 of Konishi Co., Ltd.

In the exemplary embodiment, since the rubber adhesive 612 is employed, the vibration-absorbing effect is greater than in a case where adhesive that becomes a hard solid after being cured is employed. In this respect also, vibration of the cylindrical mirror 93 is effectively suppressed.

Figure 8:
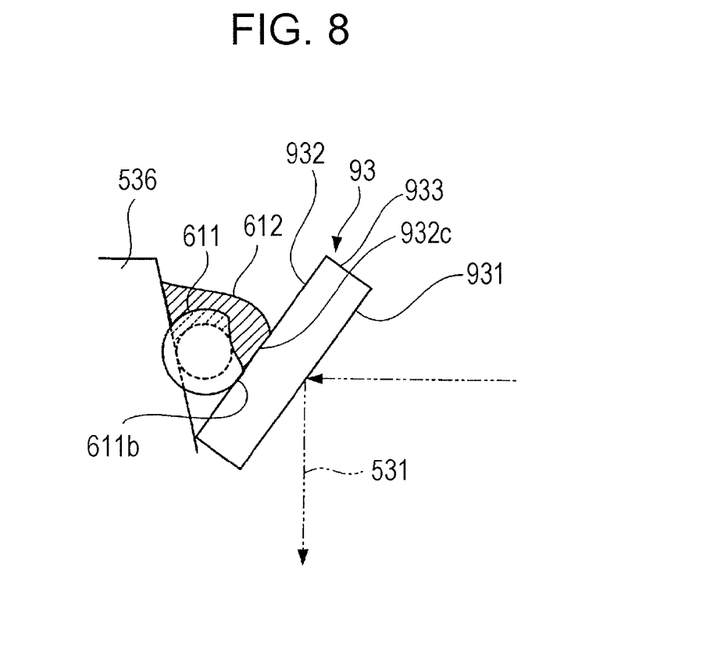
FIG. 8 is a side view of the intermediate member provided between a rib of the housing and the cylindrical mirror.

FIG. 8 is a side view of the intermediate member 611 provided between the rib 536 of the housing 532 and the cylindrical mirror 93.

The light 531 is applied to the reflective surface 931 of the cylindrical mirror 93, and is reflected downward by the reflective surface 931.

The intermediate member 611 having a round columnar shape or a substantially round columnar shape is provided between the back surface 932 of the cylindrical mirror 93 and the rib 536 of the housing 532. The rubber adhesive 612 is provided in such a manner as to connect the rib 536, the back surface 932 of the cylindrical mirror 93, and the intermediate member 611 to one another.

The intermediate member 611 having a round columnar shape or a substantially round columnar shape has a contact portion 611b that is in line contact with the back surface 932 of the cylindrical mirror 93 in a direction perpendicular to the page surface of FIG. 8. The contact portion 611b is defined at a position deviating from and below a center 932c of the back surface 932 of the cylindrical mirror 93 in the width direction intersecting the longitudinal direction of the cylindrical mirror 93. Instead, the rubber adhesive 612 is in contact with a portion of the cylindrical mirror 93 containing the center 932c.

Thus, the contact portion 611b for the line contact is defined at a position deviating from and below the center 932c of the cylindrical mirror 93 in the width direction, and the central portion of the cylindrical mirror 93 in the width direction is covered with the rubber adhesive 612. Therefore, the vibration-suppressing effect produced by the line contact with the contact portion 611b and the vibration-absorbing effect produced by the rubber adhesive 612 are combined together. Consequently, vibration of the cylindrical mirror 93 is suppressed to a negligible level that does not affect the image quality.

In the exemplary embodiment, the combination of the intermediate member 611 and the rubber adhesive 612 is employed for suppressing vibration of the cylindrical mirror 93. The combination of the intermediate member 611 and the rubber adhesive 612 may also be employed for suppressing vibrations of any other optical members, for example, the cylindrical mirror 91 and/or the plane mirror 92.

While the above exemplary embodiment concerns the exposure device 53 included in the image forming apparatus 1 configured as illustrated in FIG. 1, the invention is also applicable to exposure devices included in other types of image forming apparatuses, for example, an image forming apparatus including plural photoconductors.

Furthermore, the optical scanning device according to the invention is not limited to an optical scanning device employed as an exposure device of an image forming apparatus, and is applicable to optical scanning devices employed in various fields in which vibrations may lead to problems.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical scanning device comprising:
   a housing;
   a light source that emits light;
   a rotatable polygon mirror that receives the light from the light source while rotating and deflects the light by reflecting the light in a direction corresponding to an angle of rotation thereof;
   a scanning optical system that guides the light from the rotatable polygon mirror to a scanning object in such a manner as to repeatedly scan the scanning object with the light; and
   an intermediate member that is provided between an optical member included in the scanning optical system and the housing, the intermediate member being connected to the optical member with rubber adhesive and also being connected to the housing with the rubber adhesive, wherein the intermediate member has a substantially round columnar shape and is oriented such that a center axis thereof is parallel to a direction in which the optical member extends.

2. The optical scanning device according to claim 1, wherein the optical member and the housing are connected to each other with the rubber adhesive.

3. The optical scanning device according to claim 2, wherein the optical member is a reflective mirror extending in a direction in which the light is deflected, and
   wherein the intermediate member has a contact portion extending linearly in a direction in which the reflective mirror extends and being in contact with a back surface of the reflective mirror.

4. The optical scanning device according to claim 1, wherein the optical member is a reflective mirror extending in a direction in which the light is deflected, and
   wherein the intermediate member has a contact portion extending linearly in a direction in which the reflective mirror extends and being in contact with a back surface of the reflective mirror.

5. The optical scanning device according to claim 4, wherein the intermediate member is oriented such that the center axis thereof is parallel to the direction in which the reflective mirror extends.

6. The optical scanning device according to claim 5, wherein the intermediate member is in contact with the back surface of the reflective mirror at a position of the reflective mirror deviating from the center of the back surface of the reflective mirror in a width direction intersecting the direction in which the reflective mirror extends, and wherein the rubber adhesive adheres to a portion of the back surface of the reflective mirror containing the center in the width direction.

7. The optical scanning device according to claim 4,
wherein the intermediate member is in contact with the back surface of the reflective mirror at a position of the reflective mirror deviating from the center of the back surface of the reflective mirror in a width direction intersecting the direction in which the reflective mirror extends, and
wherein the rubber adhesive adheres to a portion of the back surface of the reflective mirror containing the center in the width direction.

8. The optical scanning device according to claim 1, wherein the intermediate member and the rubber adhesive suppress vibration of the optical member.

9. The optical device according to claim 1, wherein the housing has a projection projecting toward the optical member, and
wherein the intermediate member has a recess into which the projection fits.

10. An optical scanning device comprising:
a housing;
a light source that emits light;
a rotatable polygon mirror that receives the light from the light source while rotating and deflects the light by reflecting the light in a direction corresponding to an angle of rotation thereof;
a scanning optical system that guides the light from the rotatable polygon mirror to a scanning object in such a manner as to repeatedly scan the scanning object with the light; and
an intermediate member that is provided between an optical member included in the scanning optical system and the housing, the intermediate member being connected to the optical member with rubber adhesive and also being connected to the housing with the rubber adhesive,
wherein the housing has a projection projecting toward the optical member, and
wherein the intermediate member has a recess into which the projection fits.

11. An image forming apparatus comprising:
a developed-image-forming section including
an image bearing member on which an electrostatic latent image is formed through charging and exposure,
a charging device that charges the image bearing member,
an exposure device that performs exposure on the image bearing member by scanning the image bearing member with light modulated in accordance with an image signal, and
a developing device that forms a developed image by developing the electrostatic latent image; and
a transfer-fixing section including
a transfer device that transfers the developed image formed by the developed-image-forming section to a recording medium, and
a fixing device that fixes the developed image transferred to the recording medium,
wherein the exposure device includes
a housing;
a light source that receives the image signal and emits the light modulated in accordance with the image signal;
a rotatable polygon mirror that receives the light from the light source while rotating and deflects the light by reflecting the light in a direction corresponding to an angle of rotation thereof;
a scanning optical system that guides the light from the rotatable polygon mirror to the image bearing member in such a manner as to repeatedly scan the image bearing member with the light; and
an intermediate member that is provided between an optical member included in the scanning optical system and the housing, the intermediate member being connected to the optical member with rubber adhesive and also being connected to the housing with the rubber adhesive,
wherein the intermediate member has a substantially round columnar shape and is oriented such that a center axis thereof is parallel to a direction in which the optical member extends.

12. The image forming apparatus according to claim 11, wherein the optical member and the housing are connected to each other with the rubber adhesive.

13. The image forming apparatus according to claim 12,
wherein the optical member is a reflective mirror extending in a direction in which the light is deflected, and
wherein the intermediate member has a contact portion extending linearly in a direction in which the reflective mirror extends and being in contact with a back surface of the reflective mirror.

14. The image forming apparatus according to claim 11,
wherein the optical member is a reflective mirror extending in a direction in which the light is deflected, and
wherein the intermediate member has a contact portion extending linearly in a direction in which the reflective mirror extends and being in contact with a back surface of the reflective mirror.

15. The image forming apparatus according to claim 14, wherein the intermediate member is oriented such that the center axis thereof is parallel to the direction in which the reflective mirror extends.

16. The image forming apparatus according to claim 15,
wherein the intermediate member is in contact with the back surface of the reflective mirror at a position of the reflective mirror deviating from the center of the back surface of the reflective mirror in a width direction intersecting the direction in which the reflective mirror extends, and
wherein the rubber adhesive adheres to a portion of the back surface of the reflective mirror containing the center in the width direction.

17. The image forming apparatus according to claim 14,
wherein the intermediate member is in contact with the back surface of the reflective mirror at a position of the reflective mirror deviating from the center of the back surface of the reflective mirror in a width direction intersecting the direction in which the reflective mirror extends, and
wherein the rubber adhesive adheres to a portion of the back surface of the reflective mirror containing the center in the width direction.

18. An image forming apparatus comprising:
a developed-image-forming section including
an image bearing member on which an electrostatic latent image is formed through charging and exposure,
a charging device that charges the image bearing member, an exposure device that performs exposure on the image bearing member by scanning the image bearing member with light modulated in accordance with an image signal, and a developing device that forms a developed image by developing the electrostatic latent image; and a transfer-fixing section including a transfer device that transfers the developed image formed by the developed-image-forming section to a recording medium, and a fixing device that fixes the developed image transferred to the recording medium, wherein the exposure device includes a housing;

a light source that receives the image signal and emits the light modulated in accordance with the image signal;

a rotatable polygon mirror that receives the light from the light source while rotating and deflects the light by reflecting the light in a direction corresponding to an angle of rotation thereof;

a scanning optical system that guides the light from the rotatable polygon mirror to the image bearing member in such a manner as to repeatedly scan the image bearing member with the light; and an intermediate member that is provided between an optical member included in the scanning optical system and the housing, the intermediate member being connected to the optical member with rubber adhesive and also being connected to the housing with the rubber adhesive, wherein the housing has a projection projecting toward the optical member, and wherein the intermediate member has a recess into which the projection fits.

19. An optical scanning method comprising:

emitting light from a light source;

rotating a rotatable polygon mirror that receives the light from the light source and reflecting the light in such a manner as to deflect the light in a direction corresponding to an angle of rotation of the rotatable polygon mirror;

guiding the light from the rotatable polygon mirror through a scanning optical system to a scanning object in such a manner as to repeatedly scan the scanning object with the light; and providing an intermediate member between an optical member included in the scanning optical system and a housing of an optical scanning device, the intermediate member being connected to the optical member with rubber adhesive and also being connected to the housing with the rubber adhesive, wherein the intermediate member has a substantially round columnar shape and is oriented such that a center axis thereof is parallel to a direction in which the optical member extends.

20. The optical scanning method according to claim 18, wherein the housing has a projection projecting toward the optical member, and wherein the intermediate member has a recess into which the projection fits.

* * * * *